United States Patent
Hirata et al.

(10) Patent No.: US 11,561,394 B2
(45) Date of Patent: Jan. 24, 2023

(54) INFORMATION DISPLAY APPARATUS AND REFLECTING MIRROR USED THEREIN

(71) Applicant: MAXELL, LTD., Kyoto (JP)

(72) Inventors: Koji Hirata, Kyoto (JP); Masahiko Yatsu, Kyoto (JP); Shuji Kato, Kyoto (JP); Toshinori Sugiyama, Kyoto (JP); Michiaki Abe, Kyoto (JP); Eiji Kawawa, Kyoto (JP); Hiroyuki Kajikawa, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/277,613

(22) PCT Filed: Jul. 18, 2019

(86) PCT No.: PCT/JP2019/028354
§ 371 (c)(1),
(2) Date: Mar. 18, 2021

(87) PCT Pub. No.: WO2020/059281
PCT Pub. Date: Mar. 26, 2020

(65) Prior Publication Data
US 2021/0349312 A1 Nov. 11, 2021

(30) Foreign Application Priority Data
Sep. 21, 2018 (JP) .............................. JP2018-177288

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 1/14* (2015.01);
(Continued)

(58) Field of Classification Search
CPC ........ G02B 27/0101; G02B 1/14; G02B 5/10; B60K 35/00; B60K 2370/1529
See application file for complete search history.

(56) References Cited

U.S. PATENT DOCUMENTS

| | | | |
|---|---|---|---|
| 2016/0195719 A1 | 7/2016 | Yonetani | |
| 2017/0242248 A1* | 8/2017 | Kuzuhara | .............. B60K 35/00 |
| 2019/0346676 A1 | 11/2019 | Hirata et al. | |

FOREIGN PATENT DOCUMENTS

| | | |
|---|---|---|
| JP | 56-175802 U | 12/1981 |
| JP | 59-116905 U | 8/1984 |

(Continued)

OTHER PUBLICATIONS

International Search Report of PCT/JP2019/028354 dated Oct. 15, 2019.
(Continued)

*Primary Examiner* — Ryan D Howard
(74) *Attorney, Agent, or Firm* — Mattingly & Malur, PC

(57) ABSTRACT

An information display apparatus and an information display method configured to display video information of a virtual image on a windshield of conveyance is provided. The information display apparatus includes: a display configured to display the video information; and a virtual image optical system configured to display a virtual image at a front of the conveyance by reflecting light emitted from the display by means of the windshield. The virtual image optical system includes a concave mirror and an optical element. A reflective film is formed on a reflecting surface of the concave mirror. A protective film for preventing moisture absorption is formed on a facing surface. By forming end surfaces of the two surfaces as a curved surface or an inclined surface and forming them on the end surfaces to block moisture, moisture absorption of plastic is prevented.

12 Claims, 10 Drawing Sheets

(51) Int. Cl.
    *G02B 1/14*       (2015.01)
    *G02B 5/10*       (2006.01)
(52) U.S. Cl.
    CPC ........ *G02B 5/10* (2013.01); *B60K 2370/1529* (2019.05); *B60K 2370/23* (2019.05); *G02B 2027/0123* (2013.01)

(56)　　　　　References Cited

FOREIGN PATENT DOCUMENTS

| JP | 10-062612 A | 3/1998 |
| JP | 2003-270416 A | 9/2003 |
| JP | 2009265287 A | 11/2009 |
| JP | 2015-194707 A | 11/2015 |
| JP | 2018-084596 A | 5/2018 |

OTHER PUBLICATIONS

Japanese Office Action received in corresponding Japanese Application No. 2018-177288 dated Feb. 8, 2022.

\* cited by examiner

INFORMATION DISPLAY APPARATUS AND REFLECTING MIRROR USED THEREIN

TECHNICAL FIELD

The present invention relates to an information display apparatus and a reflecting mirror used therein, which projects an image on a windshield (hereinafter, also called as a "window glass" or a "windscreen") of a vehicle, an electric train, an airplane, or the like (hereinafter, generally referred to as a "conveyance"). In particular, the present invention relates to a projection optical system, in which an image is observed through the windshield as a virtual image, an information display apparatus, and a reflecting mirror used therein.

BACKGROUND ART

A so-called head up display (HUD: Head Up Display) apparatus has already been known by Patent Document 1 below. The head up display apparatus projects video light onto a windshield or a combiner of a vehicle to form a virtual image, thereby displaying traffic information such as route information or traffic jam information and vehicle information such as a remaining amount of fuel or cooling water temperature thereon.

In this type of information display apparatus, it is desired that a region that a driver can view a virtual image is enlarged. However, it is an important performance factor that a virtual image has high resolution, low distortion, and high visibility.

A head up display apparatus necessarily requires a windshield or combiner as a final reflecting surface by which a virtual image is provided to a driver. In order to obtain video with high visibility, good resolution performance, and low distortion, the inventors of the present application have proposed to obtain a head up display apparatus that satisfies performance factors described above by causing a shape of a concave reflecting mirror as an optical element for forming a virtual image to have an eccentric aspherical shape or a free-form surface shape having a large degree of freedom in design.

In order to obtain the eccentric aspherical mirror or the free-form mirror described above, a plastic mirror generally obtained by injection molding is used. Since plastic material as raw material expands or contracts depending upon an operating temperature, a shape of reflecting surface (the mirror) changes depending upon a temperature. Moreover, since a size change also occurs due to moisture absorption, it is a problem to use the plastic mirror in an actual usage state.

As raw material of a mirror for reducing the shape change described above, usage of cycloolefin polymer (Nippon Zeon co. ltd.: Zeonex (registered trademark)) or cycloolefin copolymer (Mitsui Chemicals: APEL (registered trademark)), which are raw materials with ultra-low moisture absorption, has already been proposed.

RELATED ART DOCUMENTS

Patent Documents

Patent document 1: Japanese Patent Application Publication No. 2015-194707

SUMMARY OF THE INVENTION

Problems to be Solved by the Invention

As illustrated in FIG. 11, a principle of generation of a virtual image by a concave mirror to realize a head up display apparatus according to a conventional technique arranges an object point AB at an inner side of a focal point F (a focal point distance f) with respect to a point O on an optical axis of a concave mirror 1', thereby allowing the virtual image by the concave mirror 1' to be obtained. In FIG. 11, for convenience of explanation, the concave mirror 1' is regarded as a convex lens with the same positive refractive power, and a relationship among an object point, the convex lens (described by the concave mirror in FIG. 11 for convenience of explanation), and the virtual image to be generated is illustrated.

In the conventional technique, in order to enlarge a size of the virtual image to be generated on the concave mirror 1', the object point AB may be caused to approach the focal point F and the concave mirror may be enlarged with respect to an object size AB. However, in order to obtain desired magnification, a radius of curvature of the concave mirror becomes smaller. Thus, it is difficult to establish both of these. As a result, a mirror size becomes smaller, and this results in a state where only a virtual image whose magnification power is effectively large but a viewable range is small can be obtained. For this reason, in order to satisfy (1) a desired size of a virtual image, and (2) necessary magnification of the virtual image M=b/a at the same time, it is necessary that a dimension of the concave mirror is fitted to a viewing range and magnification of the virtual image is determined in view of a video display apparatus.

For this reason, in the conventional technique, in order to obtain a large virtual image in a desired view range without distortion, a concave mirror that uses an eccentric aspherical surface or a free-form surface as a reflecting surface in order to reduce image distortion and occurring aberration by using a plurality of concave mirrors together has been proposed. However, there was no description about how to concretely realize a reflecting mirror having a reflecting surface with an eccentric aspherical shape or a free-form surface shape.

Further, for example, in the example of the head up display apparatus disclosed in Patent Document 1 described above, which is the conventional technique, the head up display apparatus includes a device configured to display an image and a projection optical system configured to project the image displayed by the display device. The projection optical system includes a first mirror and a second mirror on an optical path of a viewer from the display device. Miniaturization is realized by satisfying predetermined conditions for a relationship among an incident angle of the first mirror in a long axis direction of the image, an incident angle of the first mirror in a short axis direction of the image, an interval between an image display surface of the display device and the first mirror, and a width of a virtual image viewed and recognized by the viewer in a horizontal direction. However, there was no description about how to create the free-form surface mirror described above and technical means for forming a reflective film and obtaining sufficient reliability in harsh in-vehicle environment.

On the other hand, in the head up display apparatus according to the conventional technique, solar light enters the concave mirror, and the light reflected by the inside of the head up display apparatus and a concave mirror end surface returns to a driver side. There is a possibility that visibility of necessary information may be impaired by superimposing the light on original display video that the driver has to view, and a safety problem remains.

It is thus an object of the present invention to provide a suitable information display apparatus and a reflecting mirror used therein. For example, they realize a head up display apparatus that reduces distortion of video; has excellent focus performance; and can obtain video with high visibility even when outside light such as solar light enters it. It is an object of the present invention to provide an information display apparatus and a reflecting mirror used therein that has sufficient reliability even for usage environment of a vehicle while realizing a reflecting mirror, which has an eccentric aspherical or a free-form surface with a large degree of freedom in design with respect to distortion of video and correction of aberration, at a low cost.

Means for Solving the Problem

In order to solve the problem described above, for example, a configuration described in claims is adopted. The present application includes a plurality of means for solving the above problems. One example is an information display apparatus configured to display video information of a virtual image on a windshield of conveyance. The information display apparatus includes: a display configured to display the video information; and a virtual image optical system configured to display a virtual image at a front of the conveyance by reflecting light emitted from the display by means of the windshield. In this case, the virtual image optical system includes a plastic concave mirror; a reflective film made of aluminum alloy is formed on a reflective film forming surface of the concave mirror; a protective film for preventing moisture absorption of plastic is formed on a protective film forming surface that faces a mirror substrate; an end surface portion connecting the reflective film forming surface to the protective film forming surface as a facing surface thereof is formed as a shape of a curved surface or an inclined surface; and the reflective film and the protective film are also formed on the curved surface or the inclined surface.

Even though low moisture absorbent material of a low cost (for example, polycarbonate), in which optical performance thereof hardly changes even though a reflecting surface (mirror) shape changes due to occurrence of expansion or contraction depending upon operating temperature, a mirror surface shape is optimized so that sufficient reliability can be ensured, and a protective film (for preventing moisture absorption) is formed on the back surface in addition to a reflective film to be applied to the reflecting surface. At this time, an end surface of the reflecting mirror is not a flat surface perpendicular to the two surfaces described above, but is formed as a curved surface or an inclined surface and any of the reflective film and protective film or the both is also superimposed on the end surface and formed, whereby moisture intruding a substrate is blocked.

On the other hand, rays that are reflected by the windshield to return to the driver include extraordinary light generated when solar light enters a head up display apparatus, is reflected inside the set multiple times, and is reflected by a mirror end surface in addition to normal light that generates a virtual image. As a result, visibility of the driver is deteriorated because video due to the extraordinary light described above overlaps with regular video to be displayed on the head up display apparatus. Therefore, even though the solar light that enters the head up display apparatus or the light after multiple reflections is reflected by the end surface of the reflecting mirror, by being configured so that the light does not return to eyes of the driver, an information display apparatus and an information display method with high visibility of the displayed video are provided.

Effects of the Invention

According to the present invention, it is possible to provide a suitable information display apparatus and a reflecting mirror used therein. For example, even though low moisture absorbent material of a relatively low cost is used as raw material of the concave mirror, a reflecting mirror that has high resistance to moisture absorption can be obtained. Even though solar light enters the inside of the head up display apparatus and is reflected multiple times, the light hardly enters the mirror end surface, and the reflected light does not emit toward eyes of the driver. Therefore, an excellent practical effect is exerted that it becomes possible to provide an economically and generally excellent information display apparatus without deteriorating visibility of a virtual image obtained by enlarging display video of a video display apparatus.

BRIEF DESCRIPTIONS OF THE DRAWINGS

DETAILED DESCRIPTION OF EMBODIMENTS

Figure 1:
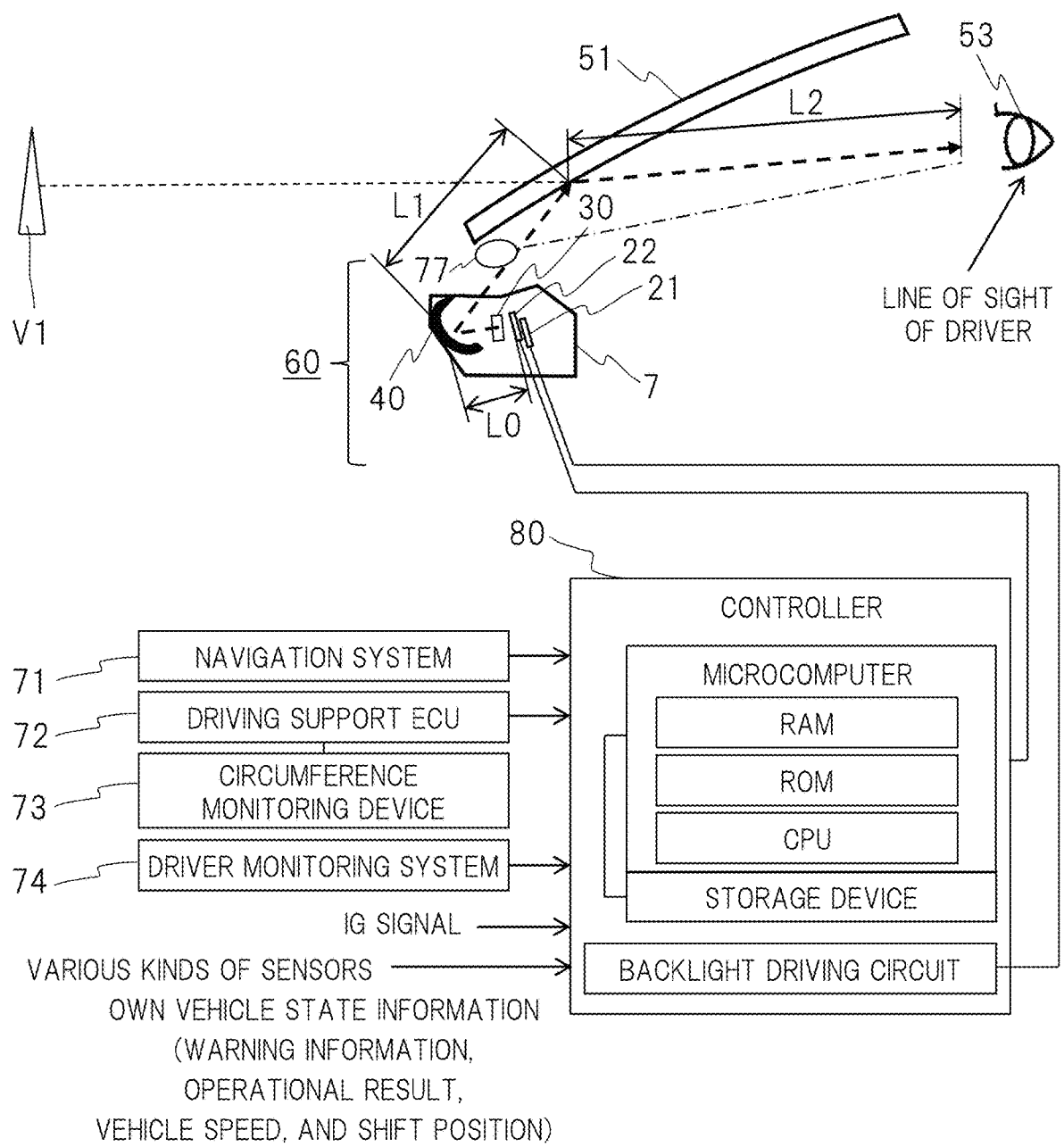
FIG. 1 is a schematic configuration diagram illustrating an information display apparatus according to an embodiment of the present invention and a peripheral equipment thereof.

Hereinafter, embodiments of the present invention will be described in detail with reference to the drawings and the like. Note that the present invention is not limited to the following explanation, and various changes and modifications can be made by a person having ordinary skill in the art within a scope of technical ideas disclosed in the present specification. Further, in all of the drawings for explaining the present invention, the same reference numeral may be attached to a component having the same function, and repeated explanation may be omitted.

<First Embodiment of Information Display Apparatus>

FIG. 1 is a block diagram and a schematic configuration diagram illustrating a peripheral equipment configuration of an information display apparatus according to one embodiment of the present invention. Here, an information display apparatus 60 configured to project an image onto a windshield of a vehicle will be described particularly as one example thereof.

This information display apparatus 60 is an apparatus (that is, a so-called head up display) configured to display, as a virtual image VI (Virtual Image), various kinds of information that are reflected by a projected member 51 (in the present embodiment, an inner surface of the windshield) in order to form a virtual image V1 at a front side of an own vehicle along a line of sight 53 of a driver. Note that the projected member 51 may be a member on which information is projected, and as the most preferable example, a windshield with a structure that is generally adopted in a vehicle can be cited unlike the windshield in which an interlayer whose cross section is a wedge shape is formed between the two sheets of glass. Note that otherwise, it may be a combiner. Namely, in the information display apparatus 60 according to the present embodiment, the projected member 6 may be a member that allows the driver to view (and recognize) a virtual image that is formed at the front side of the own vehicle along the line of sight 53 the driver. As a matter of course, vehicle information, and information on the foreground photographed by cameras (not illustrated in the drawings), such as a monitoring camera or an around viewer, are contained as the information to be displayed as the virtual image, for example.

Further, the information display apparatus 60 includes a video display apparatus 22, a concave mirror 40, and an optical element 30 for correction between the video display apparatus 22 and the concave mirror 40. The video display apparatus 22 is configured to project video light to display information. The optical element 30 is Ezone configured to correct distortion and/or aberration that occurs when a virtual image is formed by the concave mirror 40 from video displayed by the video display apparatus 22.

The information display apparatus 60 includes the video display apparatus 22 described above and a controller 80 configured to control a backlight 21. Note that optical components including the video display apparatus 22 and the backlight 21 described above are a virtual image optical system, which will be described later, and includes the mirror concave 40, which reflects light. Further, the light reflected by these optical components is reflected by the projected member 51 to go toward the line of sight 53 of the driver (EyeBox: which will be described later).

As the video display apparatus 22 described above, for example, there are a light emitting VFD (Vacuum Fluorescent Display) and the like in addition to an LCD (Liquid Crystal Display) having a backlight.

On the other hand, in place of the video display apparatus 22 described above, video may be displayed on a screen by a projection apparatus, a virtual image may be formed therefrom by the concave mirror 40 described above and reflected by a windshield 51 that is the projected member to direct to the line of sight 53 of the driver.

As such a screen, for example, the screen may be configured by a microlens array in which microlenses are arranged thereon in a two-dimensional manner.

Here, in order to reduce distortion of the virtual image, a shape of the concave mirror 40 may have a shape in which a radius of curvature at an upper portion of a general windshield 51 illustrated in FIG. 1 (that is, an area where a ray is reflected at a lower part of the windshield 51 at which a distance from a viewpoint of the driver is relatively short) so that magnification power thereof becomes larger is relatively small, and a radius of curvature at a lower portion thereof (that is, an area where a ray is reflected at an upper part of the windshield 51 at which a distance from the viewpoint of the driver is relatively long) so that magnification power thereof becomes smaller is relatively large. Further, a difference of virtual image magnifications described above is corrected by inclining the video display apparatus 22 with respect to an optical axis of the concave mirror to reduce distortion itself that may occur, whereby good correction can further be realized.

On the other hand, with respect to the windshield 51 of the vehicle, a radius of curvature Rv in a vertical direction of a body thereof is different from a radius of curvature Rh in a horizontal direction, and they generally have a relationship of Rh>Rv. For this reason, when the windshield 51 is grasped as a reflecting surface, it becomes a toroidal surface of the concave mirror. For this reason, in the information display apparatus 60 of the present embodiment, the shape of the concave mirror 40 may have different average radii of curvature between the horizontal direction and the vertical direction so as to correct the virtual image magnification by a shape of the windshield 51, that is, so as to correct a difference between the radii of curvature in the vertical direction and the horizontal direction of the windshield 51. In this case, in a case where the shape of the concave mirror 40 is a spherical or aspherical shape symmetric about the optical axis (that is, a shape expressed by Formula 2, which will be described later), it becomes a function of a distance r from the optical axis, a horizontal cross-sectional shape and a vertical cross-sectional shape of separated places cannot be controlled individually. Therefore, it is preferable to correct the difference as a function of a coordinate (x, y) on a surface from the optical axis of a mirror surface as a free-form surface expressed by Formula 1 (will be described later).

Figure 12:
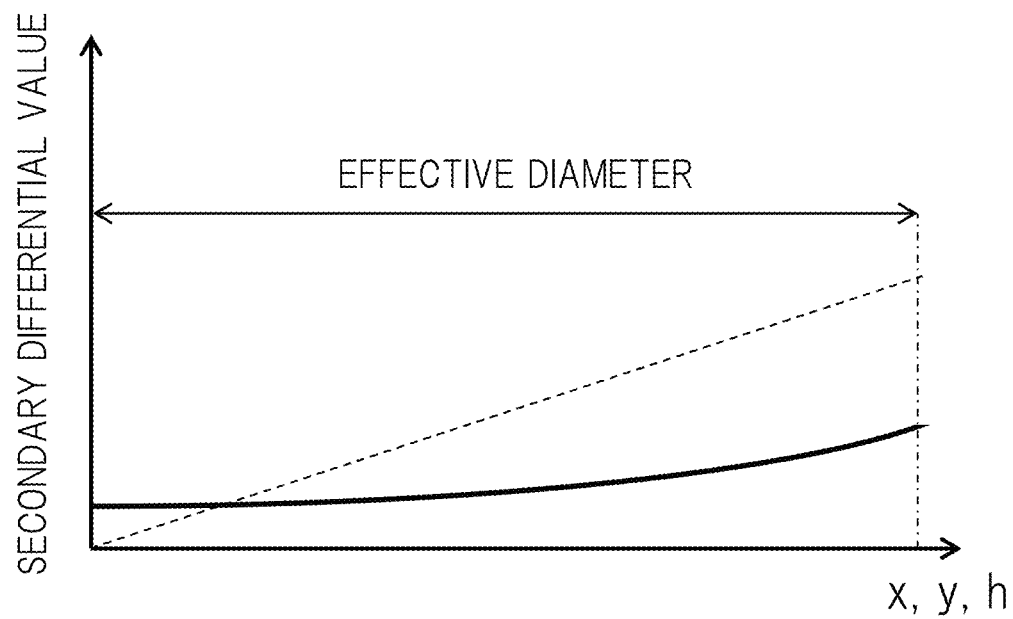
FIG. 12 is an explanatory drawing for explaining a feature of a mirror surface shape.

Note that FIG. 12 illustrates a graph obtained by secondarily differentiating a coefficient of the free-form surface of the concave mirror 40. By configuring the concave mirror 40 in this manner, it is possible to realize excellent temperature characteristics in which the power fluctuation of the mirror is small with respect to the temperature fluctuation.

$$Z = \frac{c \cdot (x^2 + y^2)}{1 + \sqrt{1 - (1 + K)c^2 \cdot (x^2 + y^2)}} + \sum\sum (Cj(m, n) \times x^m \times y^n)$$

$$j = [(m + n)^2 + m + 3n]/2 + 1$$

[Formula 1]

$$Z = \frac{c \cdot h^2}{1 + \sqrt{1 - (1 + K)c^2 \cdot h^2}} + A \times h^4 + B \times h^6 + C \times h^8 +$$

$$D \times h^{10} + E \times h^{12} + F \times h^{14} + G \times h^{16} + H \times h^{18} + J \times h^{20}$$

[Formula 2]

Further, the optical element 30 is arranged between the video display apparatus 22 and the concave mirror 40 as a transmissive optical component, for example. By controlling an emission direction of the ray to the concave mirror 40, aberration correction of the virtual image including astigmatism that occurs due to the difference between the radius of curvature in the horizontal direction and the radius of curvature in the vertical direction of the windshield 51 described above is realized at the same time as correction of distortion aberration is carried out in accordance with the shape of the concave mirror 40.

Further, in order to further heighten aberration correction capability, the optical element 30 as described above may be constituted by a plurality of lenses. Alternatively, by arranging a curved mirror in place of the lens element and controlling an incident position of the ray to the concave mirror 40 at the same time of folding of the optical path, it is possible to reduce distortion aberration. As described above, it goes without saying that it does not depart from technical ideas or a range of the present invention even though an optical element optimally designed to improve the aberration correction capability is further provided between the concave mirror 40 and the video display apparatus 22. Moreover, by changing a thickness of the optical element 30 described above in an optical axis direction, an optical distance between the concave mirror 40 and the video display apparatus 22 can be changed in addition to true aberration correction, whereby it is possible to continuously change a display position of the virtual image from a distant place to an adjacent position.

Further, by arranging the video display apparatus 22 so as to incline the same with respect to a normal line of the optical axis of the concave mirror 40, the difference of magnifications of the virtual image in the vertical direction may be corrected.

On the other hand, as a factor to deteriorate image quality of the information display apparatus 60, there is known a fact that a video light ray emitted from the video display apparatus 22 toward the concave mirror 40 is reflected by a surface of the optical element 30 and an inner wall surface of a housing 7 of the information display apparatus 60, which are arranged in the middle, to return to the video display apparatus 22, and is then reflected again to be superimposed on true video light, whereby the image quality thereof is deteriorated. Moreover, solar light is reflected by the concave mirror 40 to enter the inside of the housing 7 of the information display apparatus 60. The light is reflected by an edge of the concave mirror 40, and returns to the line of sight 53 of the driver as extraordinary light, whereby visibility is deteriorated.

For this reason, in the present embodiment, it is preferable that the information display apparatus 60 is designed so that not only antireflection coating is formed on the surface of the optical element 30 to suppress the reflection, but also a lens surface shape of any one or both of an incident surface and an emission surface of the optical element 30 for the video light is caused to have restriction for the surface shape to become a shape so that the reflected light described above does not focus on a part of the video display apparatus 22 (for example, a shape in which a concave surface faces the video display apparatus 22).

Next, in a case where, as the video display apparatus 22, a second polarizing plate is arranged so as to be separated from a liquid crystal panel in addition to a first polarizing plate arranges in proximity to the liquid crystal panel in order to absorb the reflected light from the optical element 30 described above, it is possible to reduce deterioration in the image quality. Further, the backlight 21 of the liquid crystal panel is controlled so that an incident direction of light incident on the liquid crystal panel (=the video display apparatus) 22 efficiently enters an incident eye of the concave mirror 40. At this time, by making a divergent angle of a light flux incident on the liquid crystal panel smaller, it becomes possible to effectively direct video light toward eye points of the driver. In a case where a liquid crystal display element is used as a video source, contrast performance in the horizontal direction with respect to the divergent angle of the video is remarkable. When a visual angle is within ±20°, an excellent property can be obtained. In order to further improve the contrast performance, a light flux whose visual angle is within ±10° may be used.

On the other hand, it is preferable that a solid light source with long product lifetime is adopted as the light source. Moreover, it is preferable that polarization conversion is further carried out by using a PBS (Polarizing Beam Splitter) in which optical means for reducing a divergent angle of light as LED (Light Emitting Diode) whose change in light output with respect to variation in ambient temperature is small is provided.

Polarizing plates are respectively arranged at the backlight 21 side (light incident surface) and the optical element 30 side (light emission surface) of the liquid crystal panel (=the video display apparatus) 22. This makes it possible to heighten a contrast ratio of the video light (in particular, it is important to improve efficiency of reflection by a windshield in order to ensure brightness of the virtual image, and in consideration of this point, it is preferable that S-polarized light is used as the video light). In a case where iodine-based one in which the degree of polarization is high is adopted for the polarizing plate provided at the backlight 21 side (light incident surface), a high contrast ratio can be obtained. On the other hand, by using a dye-based polarizing plate for one provided at the optical element 30 side (light emission surface), it becomes possible to obtain high reliability even in a case where outside light enters or ambient temperature is high.

In a case where the liquid crystal panel is used as the video display apparatus 22, in particular, in a case where the driver wears polarized sunglasses in such a situation, a specific polarized wave is blocked or shielded, whereby a defect in which video cannot be viewed occurs. In order to prevent this situation, it is preferable that a λ/4 plate is arranged at a side of the optical element of the polarizing plate that is arranged at the optical element 30 side of the liquid crystal panel, whereby the video light uniformed to a specific polarization direction is converted into circular polarized light.

The controller 80 obtains, from a navigation system 71, various kinds of information such as a speed limit and the number of lanes of a road corresponding to a current position at which the own vehicle is travelling, and a scheduled movement route of the own vehicle set to the navigation system 71 as foreground information (that is, information to be displayed at a front of the own vehicle by the virtual image described above).

A driving support ECU 72 is a controller that realizes driving support control by controlling a drive system and a control system in accordance with an obstacle detected as a result of monitoring by a circumference monitoring device 73. The driving support control includes well-known technologies such as cruise control, adaptive cruise control, pre-crush safety, lane keeping assist, for example.

The circumference monitoring device 73 is a device for monitoring a status of a circumference of the own vehicle. As one example, there are a camera that detects an object existing on the circumference of the own vehicle on the basis of an image obtained by photographing the circumference of the own vehicle, an exploratory device that detects an object existing around the own vehicle on the basis of a result obtained by transmitting and receiving an exploratory wave, and the like.

A driver monitoring system 74 executes support for safe driving by monitoring facial expression of the driver while driving by a camera (a part of various kinds of sensors) installed in front of a driver's seat, determining whether there is any problem in driving such as a health status or a mental condition or not, and causing the driving support ECU 72 to control driving of the own vehicle on the basis of a result thereof. Further, in order to detect the health status of the driver, sensors for respectively detecting a pulse, a respiratory rate, and body temperature may be provided in the driver's seat (not illustrated in the drawings), and similar sensing functions can also be obtained by software processing through the camera described above. Moreover, by detecting drowsiness and the like as well, high accurate support for safe driving can be realized. In addition, it can be used as means for detecting a position of a line of sight of the driver in order to display video of the HUD at the optimal position.

The controller 80 obtains such information from the driving support ECU 72 (for example, a distance to a preceding vehicle and a direction of the preceding vehicle, a position at which an obstacle or a traffic sign exists, and the like) as foreground information. Moreover, an ignition (IG) signal and own vehicle state information are inputted to the controller 80. The own vehicle state information among these kinds of information is information obtained as the vehicle information. For example, the own vehicle state information contains warning information indicating to become an abnormal state defined in advance, such as residual quantity of fuel for an internal-combustion engine or temperature of cooling water. Further, the own vehicle state information also contains an operational result of a direction indicator, travelling speed of the own vehicle, and shift position information. The controller 80 that has been mentioned above is activated when the ignition signal is inputted thereto. As the above, the whole system of the information display apparatus according to the present embodiment has been described.

Figure 2:
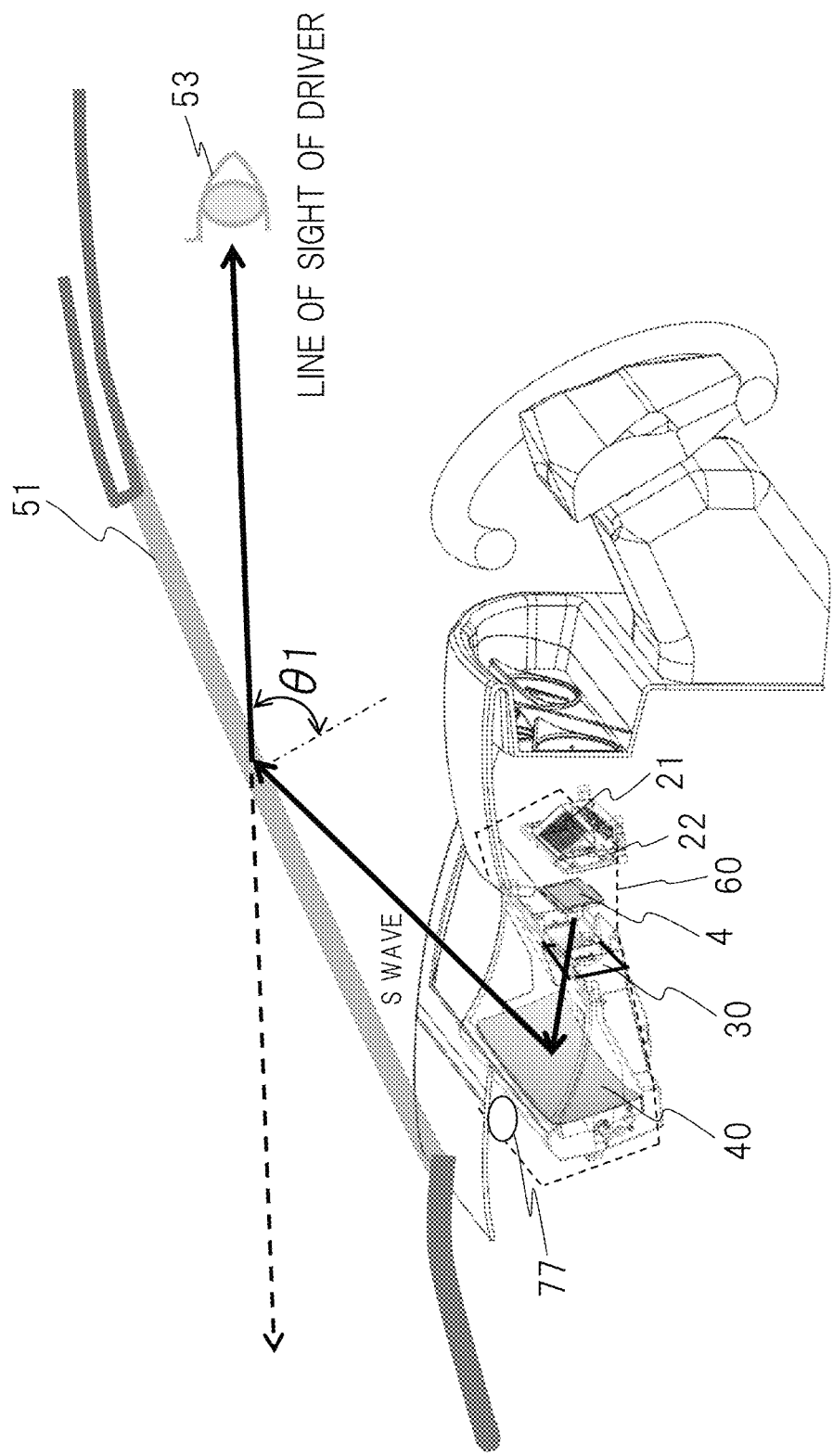
FIG. 2 is a side view illustrating an outline of a vehicle on which an information display apparatus (which does not include an optical path folding mirror) is mounted.

FIG. 2 is a structural drawing illustrating arrangement of main structural parts constituting the information display apparatus 60 and a state where they are mounted on the vehicle. Inside the information display apparatus 60, the light of the backlight 21 is modulated by the video display apparatus 22 in accordance with a video signal to display the video. This display video is projected to obtain a virtual image at a predetermined position by means of magnifying action of the concave mirror 40. The optical element 30 is arranged between the concave mirror 40 and the video display apparatus 22 to correct distortion of the virtual image and aberration that occurs. In order to prevent the solar light to pass through the windshield and being focused on the video display apparatus 22 via the concave mirror 40 and improve the contrast performance, a polarizing plate 4 having a characteristic of S-polarized light transmission is arranged. It is a system in which the video display apparatus 22 and the concave mirror 40 are arranged so as to face each other. It is possible to correct distortion or aberration of the virtual image successfully in a case where a free-form surface shape that has a large degree of freedom in design is adopted for a reflecting surface shape of the concave mirror 40 and a shape of the optical element 30.

<Embodiment of Virtual Image Optical System>

Next, further details of the virtual image optical system and the video display apparatus will be described below.

A windshield exists as the projected member 51 in front of a driver's seat of a vehicle body. Note that an inclination angle of this windshield with respect to the vehicle body is different depending upon a type of the vehicle. Moreover, the inventors of the present application researched this radius of curvature in order to realize an optimum virtual image optical system. As a result, as illustrated in FIG. 2, the inventors found that in the windshield, the radius of curvature Rh in the horizontal direction parallel to a contact surface of the vehicle is different from the radius of curvature Rv in the vertical direction orthogonal with respect to a horizontal axis, and there is generally a relationship below between Rh and Rv.

$$Rh > Rv$$

Further, it was also found that most of vehicles has this difference between the radii of curvature, that is, the Rh with respect to Rv in a range from 1.5 times to 2.5 times.

Next, the inventors also researched commercial products with respect to an inclination angle of the windshield. As a result, although it is different depending upon a vehicle body type, it was 20° to 30° in a light motor vehicle or a minivan type, 30° to 40° in a sedan type, and 40° or more in a sports type. Thus, in the present embodiment, a difference between the radius of curvature Rh in the horizontal direction of the windshield parallel to the contact surface of the vehicle and the radius of curvature Rv in the vertical direction orthogonal to the horizontal axis and the inclination angle of the windshield were considered to design the virtual image optical system.

More specifically, since the horizontal radius of curvature Rh and the vertical radius of curvature Rv of the windshield that is the projected member are greatly different from each other, good aberration correction was realized by providing the optical element 30, which has an axially asymmetric shape with the horizontal axis of the windshield with respect to the optical axis (Z axis) and the axis vertical to this axis, and the reflecting mirror having the eccentric aspherical or the free-form surface shape in the virtual image optical system. Note that these optical elements and the reflecting mirror can be obtained easily by injection molding a plastic substrate using a mold.

<Second Embodiment of Information Display Apparatus>

Figure 3:
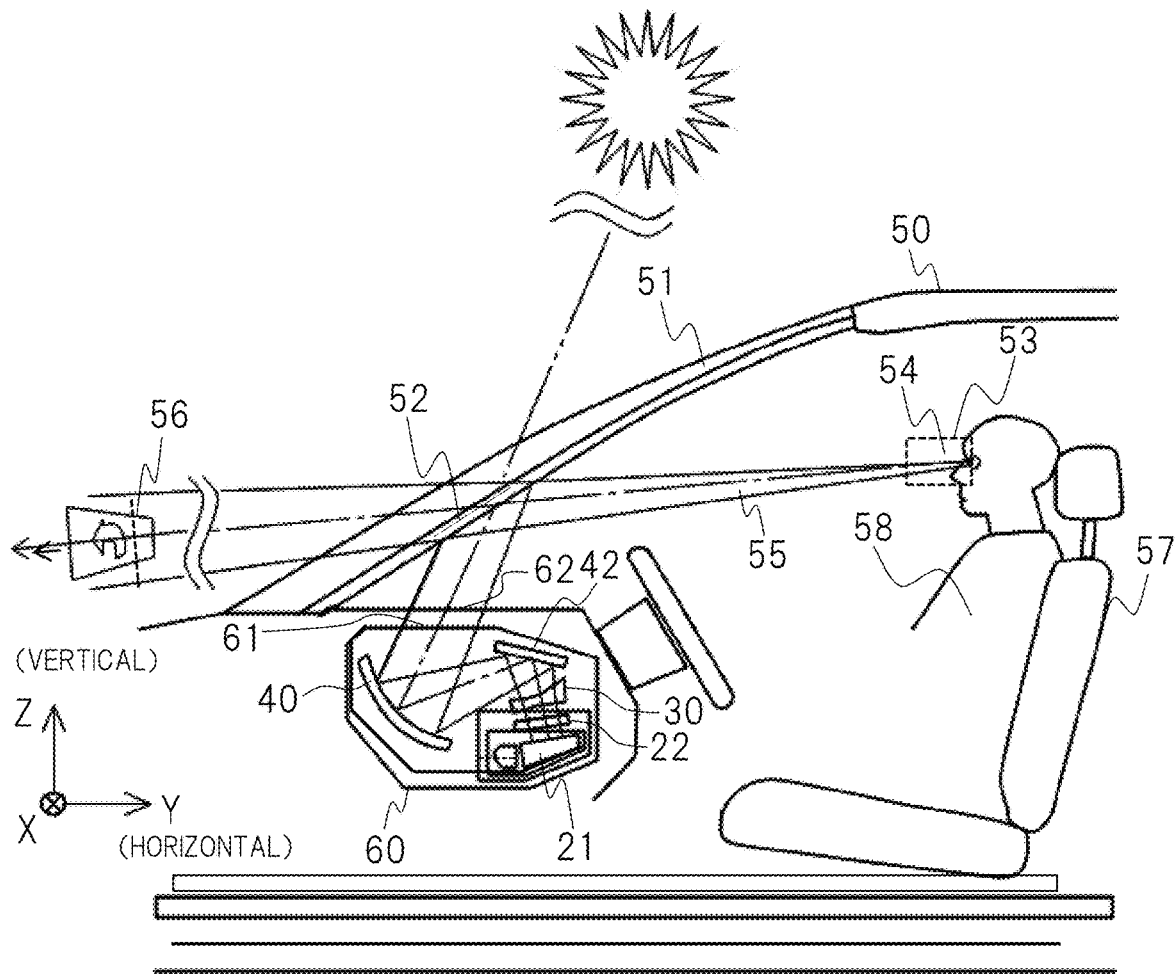
FIG. 3 is a side view illustrating an outline of a vehicle on which an information display apparatus (which includes an optical path folding mirror) is mounted.

FIG. 3 is a side view illustrating a state where a head up display apparatus whose set volume is reduced by an optical path folding mirror 42 in place of the configuration of the embodiment described above is arranged behind an instrument panel and attached to the vehicle. A virtual image is obtained at a predetermined position by acting video displayed on the video display apparatus 22 by means of the concave mirror 40. In order to obtain a virtual image with small distortion and well-corrected aberration in the distance with high magnification, the optical element 30 for correcting aberration is arranged between the video display apparatus 22 and the concave mirror 40. Note that the other configuration and operations are substantially similar to those described above, and description thereof will be omitted herein.

<Practical Problem of Plastic Mirror>

The reflecting surface shape of the concave mirror 40 described above adopts a free-form surface shape with a large degree of freedom in design. Plastic material is injection-molded and formed in order to obtain a shape with high accuracy for the design shape. However, the plastic material not only expands or contracts depending upon operating temperature, but also expands due to moisture absorption, whereby a shape of a reflecting surface (mirror) changes. For this reason, cycloolefin polymer or cycloolefin copolymer, which is ultra-low moisture absorbent material with a high material cost, has conventionally been used.

Therefore, the inventors of the present application looked for technical means for suppressing moisture absorption even though low moisture absorbent material of a low cost (for example, polycarbonate) is used, and a mirror shape in which optical performance thereof hardly changes even though environmental temperature fluctuates and a mirror surface shape thereby changes.

Figure 4:
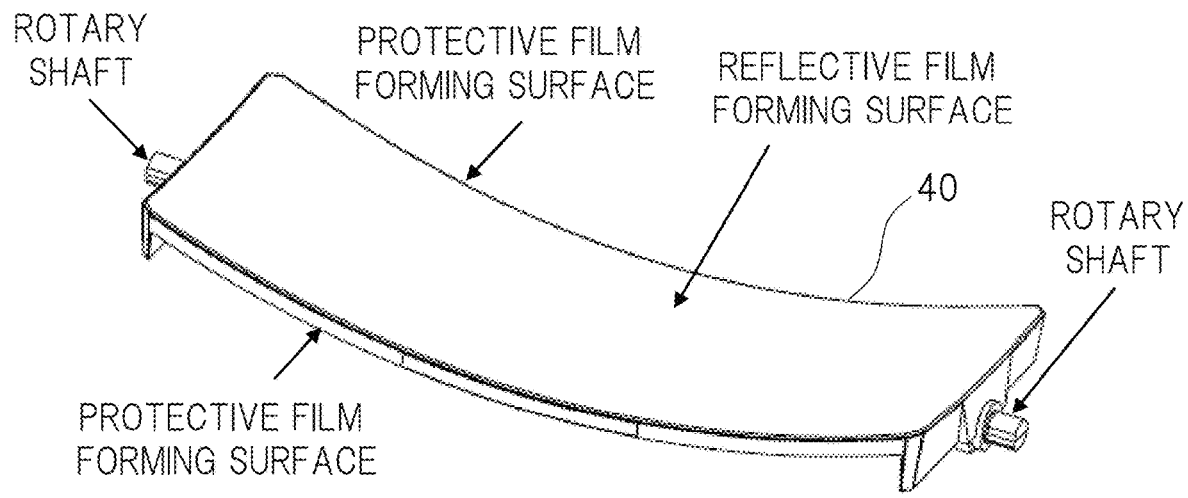
FIG. 4 is a schematic perspective view illustrating the whole structure of a plastic reflecting mirror.

FIG. 4 illustrates an appearance shape of the concave mirror 40 described above, and FIG. 5 illustrates a front view, a side view, and a bottom view thereof. As described above, the concave mirror 40 is formed by injection molding the plastic material. A thickness t of the concave mirror made of the plastic material needs to consider fluidity of the plastic in addition to the required mechanical strength. Therefore, the thickness t is determined based on the external dimensions of the concave mirror. For example, if a width W is about 180 mm and a height h is about 80 mm, the thickness t may be 3 to 5 mm. If the width W is 300 mm and the height h is 160 mm, the thickness t may be about 5 to 7 mm. Further, if a surface shape of the surface that faces a surface (that is, a reflecting surface) on which a reflective film is formed is the same shape as the reflecting surface, that is, a mirror surface, the entire mirror has a uniform wall thickness, whereby fluidity of resin is enhanced, and moldability is improved.

It is necessary to rotate the concave mirror 40 so that a generation position of the virtual image can be moved up and down in accordance with a height of eyes of the driver. For this reason, a rotary shaft perpendicular to the optical axis of the reflecting surface is provided on a side surface of the concave mirror.

In order to prevent moisture absorption of the plastic on this concave mirror 40, the inventors of the present application formed a reflective film (Al alloy) and an increased reflective film on the mirror surface by means of a sputtering apparatus, and formed an Al alloy on the facing surface as a protective film. Then, the concave mirror thus formed was left in a state of being attached to a head up display apparatus under high-temperature and high-humidity environment (for example, 70° C., 70% RH). Results thereof are indicated below.

Figure 6:
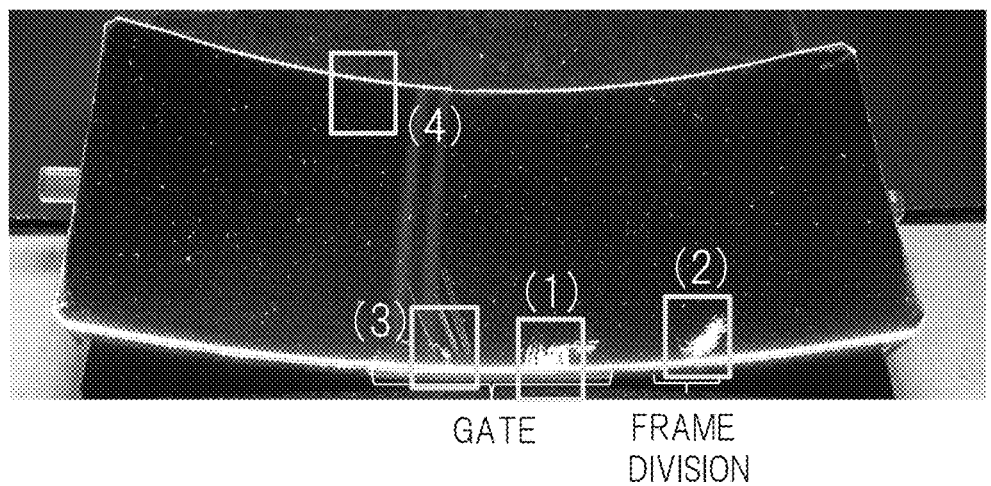
FIG. 6 is a view illustrating a surface state after a life test of the plastic reflecting mirror.

FIG. 6(a) is a photograph showing a state of the reflecting surface after it is left for 1200 hours. Peeling of the reflective film (whitened portions in the photograph) occurred starting a gate portion and a frame dividing portion at the lower end of FIG. 6(a). FIG. 6(b) is enlarged photographs of peeling portions ((1), (2), and (3)) and a normal portion ((4)) of FIG. 6(a). As is clear from these photographs, moisture intruded from an end surface obtained by cutting off a gate or a portion obtained by dividing a frame, and the reflective film was peeled.

Figure 7:
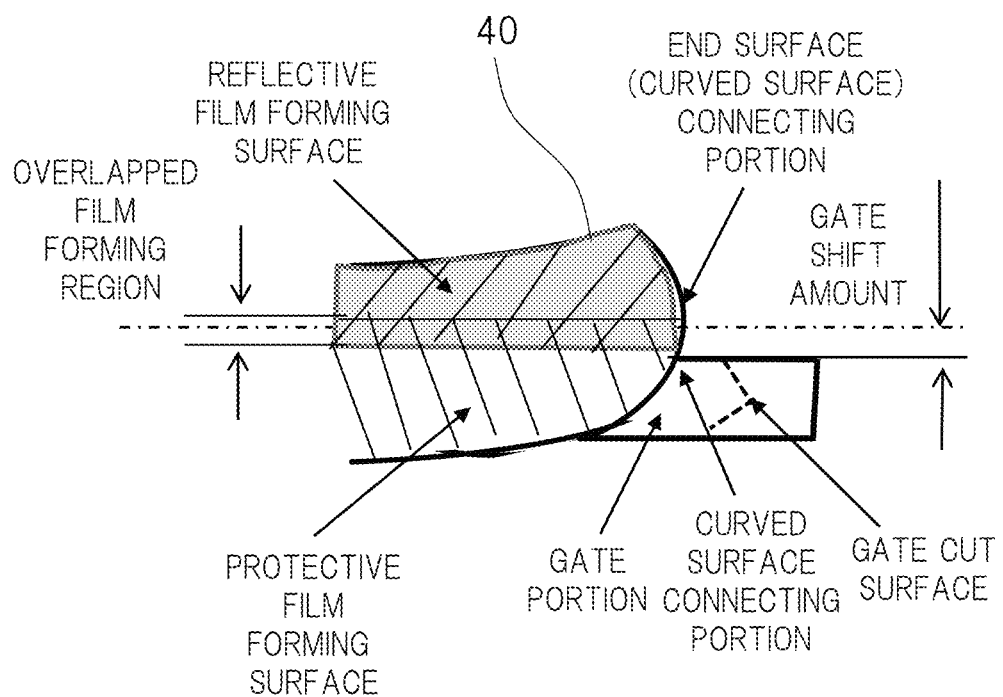
FIG. 7 is a view illustrating an end surface shape of the plastic reflecting mirror according to the present invention.

For that reason, as illustrated in FIG. 7, which is an enlarged view taken by an A-A cross section of FIG. 5(c), end surfaces pf a reflective film forming surface and a protective film forming surface facing the reflective film forming surface, which were conventionally formed as orthogonal straight lines, are connected by a curved line (or a curved surface) instead of a straight line (or a flat surface). This causes the reflective film and the protective film to go around each other and overlap (an overlapped film forming region illustrated in FIG. 7), thereby having a structure in which a mirror substrate is sealed with the reflective film and the protective film. Namely, at an end surface (curved surface) connecting portion illustrated in FIG. 7, a total surface distance (that is, a junction area) between the reflective film and the protective film, which are formed on the curved surface by the sputtering apparatus, is expanded to strengthen the junction between the films, thereby heightening a degree of sealing. In particular, in a vertical direction with respect to the reflective film forming surface and the protective film forming surface, an upper end (a portion protruding to the rightmost side in FIG. 6(a)) of the curved surface at the protective film forming surface side where the gate portion is formed extends slightly upward beyond the gate portion (agate shift amount). As a result, overlapped film forming regions of the reflective film and the protective film to be formed are secured.

Figure 5:
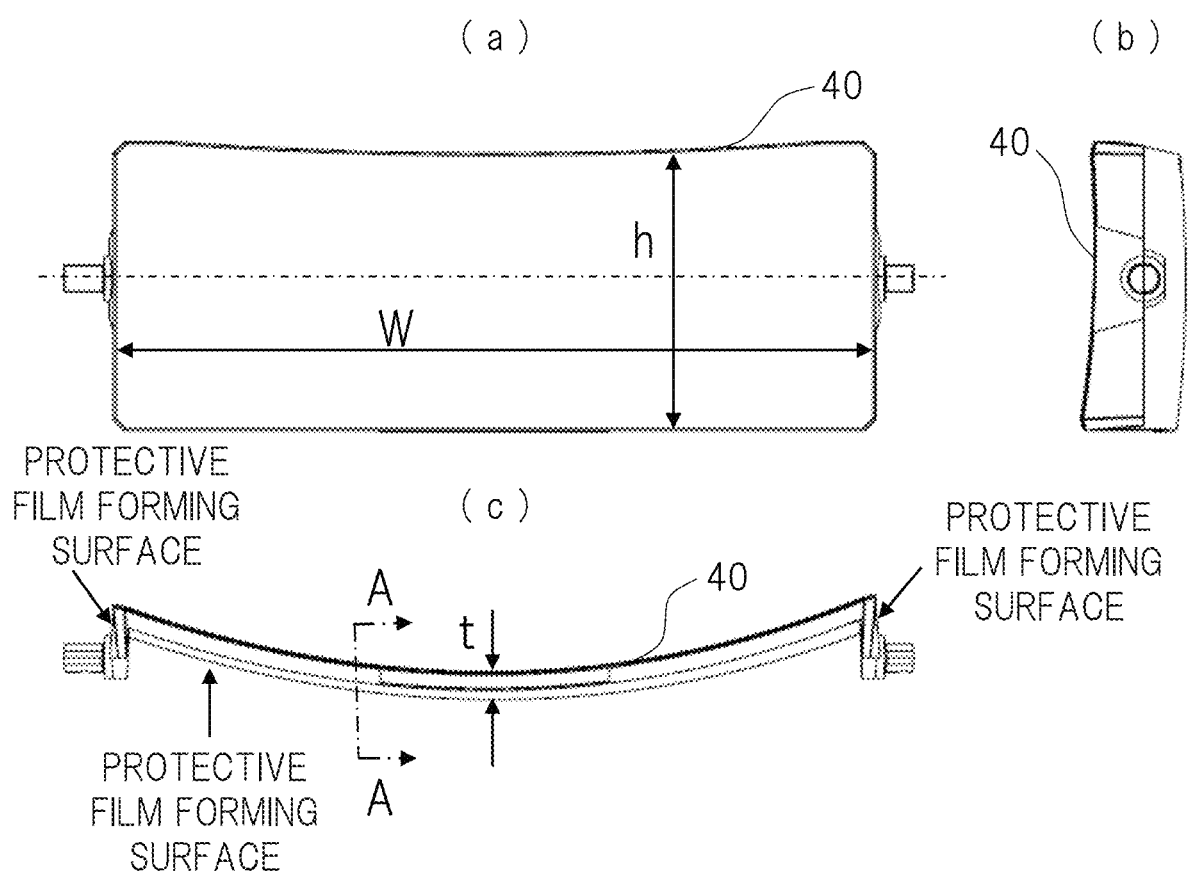
FIG. 5 is a view illustrating three side views of the plastic reflecting mirror.

As is clear from FIG. 5, the reflective film forming surface is curved slightly upward in the vicinity of a peripheral end surface of the mirror substrate. The end surface (curved surface) connecting portion described above extends from an apex part of this reflective film forming surface toward the protective film forming surface. As a result, a thickness between the reflective film forming surface and the protective film forming surface on the peripheral end surface is increased, and a frame-like portion is formed on a peripheral portion of the mirror substrate, thereby improving the strength of the mirror substrate. Further, in particular, according to the end surface (curved surface) connecting portion by such a curved surface, the reflected light around the concave mirror 40 after the reflective film is formed is returned to the video display apparatus 22 by the curved surface, and is reflected again. This contributes improvement of visibility of the information display apparatus 60 without being superimposed on the video light or without returning to the line of sight 53 of the driver as the extraordinary light. Note that in the above, the end surface connecting portion has been described as the end surface (curved surface) connecting portion by the curved surface. However, the present invention is not limited to only this. It is clear that the similar effects can be obtained even by forming the concave mirror 40 by two or more inclined surfaces, for example, in place of the curved surface.

Moreover, as illustrated in FIG. 5 by a broken line, a cut surface of the gate portion is cut off so as to have an inclined surface with respect to the substrate, whereby the reflective film and the protective film are joined to each other along the inclined surface and formed. Intrusion of moisture from this is blocked, and this makes it possible to obtain higher sealing performance. Further, one side end surface of the gate of the concave mirror substantially coincides with the protective film forming surface.

Figure 8:
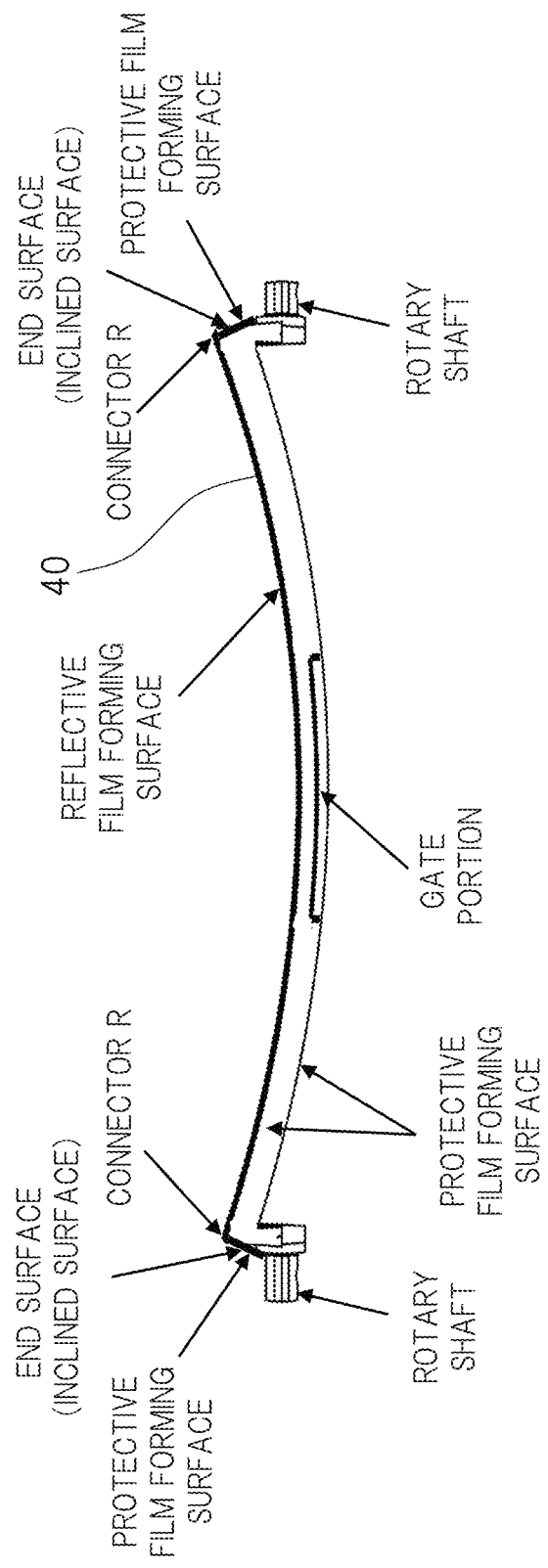
FIG. 8 is a view illustrating a side surface shape of the plastic reflecting mirror according to the present invention.

FIG. 8 is a structural drawing illustrating appearance of a reflecting mirror substrate. The reflective film may be formed so that two end surfaces at which mirror rotary shafts are respectively provided are also formed as the inclined surface. Moreover, it is possible to realize a sealing structure without an edge portion by being connected to the end surface of the reflecting surface by the curved surface.

On the other hand, as illustrated in FIG. 8, by providing the gate portion close to the protective film forming surface facing the reflecting surface, a creepage distance can be made large even though sealability is reduced by forming the reflective film and the protective film unevenly depending upon a state of a gate cut surface. Therefore, the reflective film formed on the reflecting surface is not peeled. Note that it is apparent to those skilled in the art that the cut surface of this gate portion may also be an end surface (curved surface) connecting portion in the similar manner to that described above.

<Practical Problem of Head Up Display>

Figure 9:
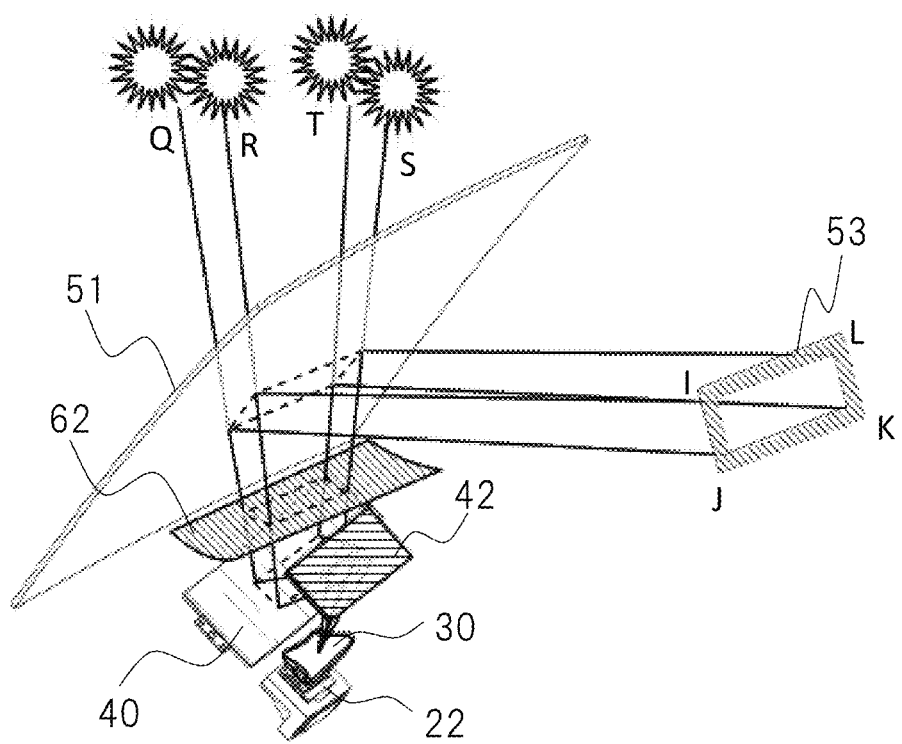
FIG. 9 is a schematic view illustrating component arrangement of the information display apparatus illustrated in FIG. 3.

A head up display apparatus illustrated in FIG. 9 obtains a virtual image obtained by enlarging video displayed by the video display apparatus 22 by means of the concave mirror 40. In order to correct distortion of the virtual image and occurring aberration, the optical element 30 is arranged between the video display apparatus 22 and the concave mirror 40. If each of the reflecting surface of the concave mirror 40 and a lens surface shape of the optical element 30 has a free-form surface, the correction ability is further improved. By arranging the optical path folding mirror 42 between the optical element 30 and the concave mirror 40 and folding a video light flux (the second embodiment described above), the head up display apparatus is downsized and the installation capacity on the vehicle body is improved.

The video light flux that forms an enlarged virtual image obtained by the head up display apparatus passes through an antidazzle window 62 provided in an opening, which is a part of a housing of a main body; is reflected by the windshield 51; and goes toward the driver to form a virtual image. In the head up display apparatus having the configuration described above, in a case where the sun is at a specific position, solar light passes through the windshield 51 to enter the inside of the head up display. At this time, in a case where the solar light as illustrated in FIG. 9 is focused on the central portion of the video display apparatus 22 due to a relative positional relationship between the sun and the head up display apparatus, stray light due to multiple reflections inside the apparatus is hardly generated. The multiple reflections generated by the surface reflection of the optical element 30 are superimposed on video of the virtual image, and focus or contrast performance is reduced. This gives a bad influence to the image quality.

Figure 10:
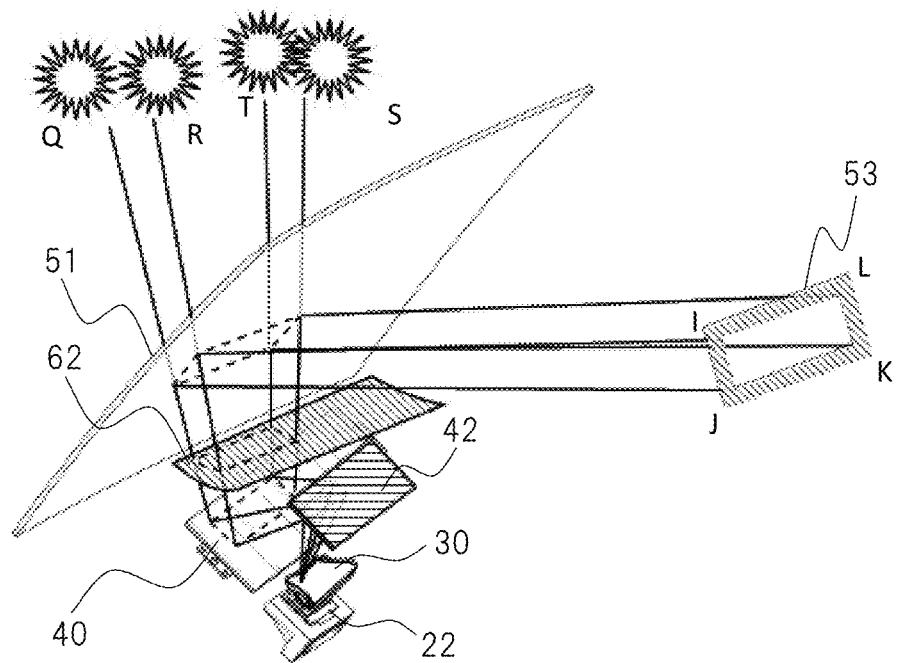
FIG. 10 is a schematic view illustrating a basic structure of the information display apparatus, which includes an optical element (that is, a lens), and rays that passes through a peripheral portion of the optical element (the lens)
Figure 11:
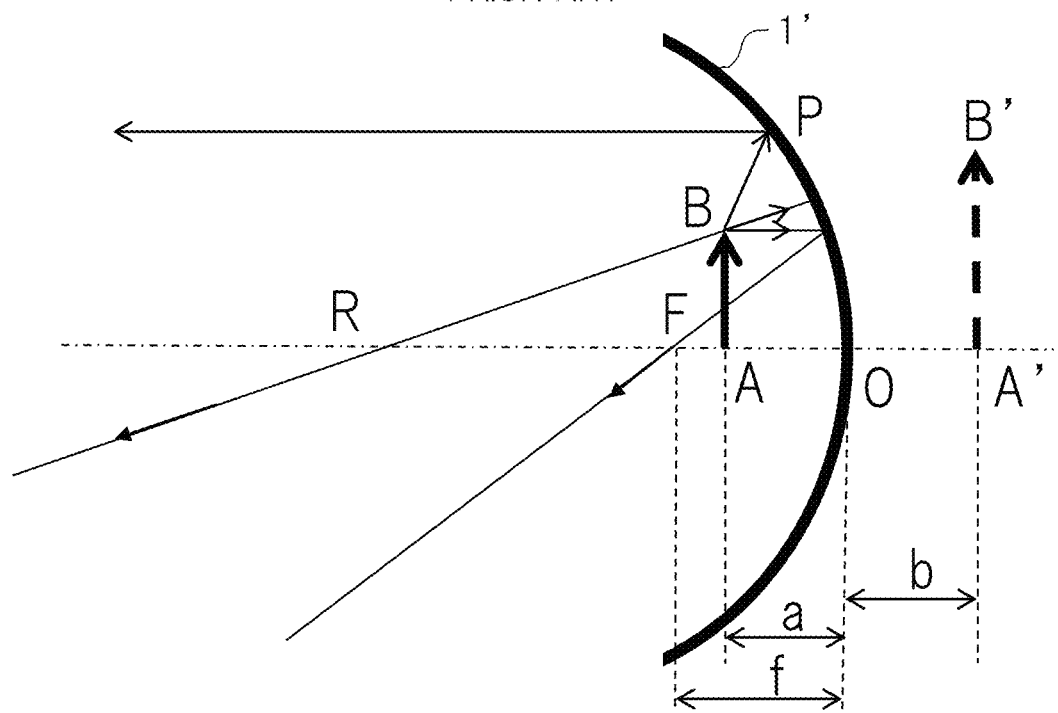
FIG. 11 is a view for explaining a mechanism of generating a virtual image by a concave mirror.

Similarly, in the head up display apparatus, in a case where the sun is at another specific position, solar light passes through the windshield 51 to enter the inside of the head up display. At this time, the solar light as illustrated in FIG. 10 is focused on a corner portion of the video display apparatus 22 due to the relative positional relationship between the sun and the head up display apparatus. Part of this solar light is reflected inside the apparatus multiple times, and stray light due to this is reflected by an end surface of the optical element 30 and an end surface of the reflecting mirror at an angle close to the critical angle to generate multiple reflections with a high reflection factor. The multiple reflections are superimposed on video of the virtual image, whereby focus or contrast performance is greatly reduced.

Therefore, the inventors of the present application found that deterioration in image quality of a virtual image can be reduced due to multiple reflections generated by reflection at the end surface described above by causing a shape of the end surface to be an inclined surface or a curved surface by which reflected light does not return to a video light side. The inventors of the present application also confirmed that the end surface of the optical element has the same effects by the similar processing. Here, a shape processing of the end surface of the optical element will be described below.

An end surface shape of the optical element including the optical path folding mirror 42 may be formed as a curved surface shape as illustrated in FIG. 7 or an inclined surface as illustrated in FIG. 8 so that the incident solar light is not reflected by the end surface of the reflecting mirror to return to a virtual image side, that is, the light reflected by the end surface is not returned to the virtual image side. However, FIG. 7 and FIG. 8 are explanatory drawings of an end surface shape of the concave mirror 40. Since the shapes for reducing the light reflected by the end surface are almost the same as each other, they are substituted.

As described above, the sheet-like light source apparatus suitable to be used for an electronic apparatus provided with the image display device according to various embodiments of the present invention has been described. However, the present invention is not limited to the embodiments described above, and various modifications are contained. For example, the whole system has been explained in detail in the embodiments described above for explaining the present invention clearly. The present invention is not necessarily limited to one that includes all configurations that have been explained. Further, a part of the configuration of one embodiment can be replaced by a configuration of the other embodiment. Further, a configuration of the other embodiment can be added to a configuration of one embodiment. Moreover, a part of the configuration of each of the embodiments can be added to the other configuration, deleted or replaced thereby.

REFERENCE SIGNS LIST

4 . . . polarizing plate, 7 . . . housing, 21 . . . backlight, 22 . . . video display apparatus (display), 30 . . . optical element, 40 . . . concave mirror, 42 . . . folding mirror, 51 . . . projected member (windshield), 52 . . . projection region, 53 . . . EyeBox (eyes of observer), 54 . . . eye, 56 . . . virtual image, 57 . . . driver's seat, 58 . . . driver, 60 . . . information display apparatus, 61 . . . housing opening, 62 . . . antiglare plate, 71 . . . navigation system, 72 . . . driving support ECU, 73 . . . circumference monitoring device, 74 . . . driver monitoring system, 77 . . . monitoring camera, 80 . . . controller, V1 . . . virtual image, I . . . left upper end position, IL . . . video light, J . . . left lower end position, K . . . right lower end position, and L . . . right upper end position.

The invention claimed is:

1. An information display apparatus configured to display video information of a virtual image on a windshield of conveyance, the information display apparatus comprising:
 a display configured to display the video information; and
 a virtual image optical system configured to display a virtual image at a front of the conveyance by reflecting light emitted from the display by means of the windshield,
 wherein the virtual image optical system includes a plastic concave mirror; a reflective film made of aluminum alloy is formed on a reflective film forming surface of the concave mirror; a protective film for preventing moisture absorption of plastic is formed on a protective film forming surface that faces a mirror substrate; an end surface portion connecting the reflective film forming surface to the protective film forming surface as a facing surface thereof is formed as a shape of a curved surface or an inclined surface; and the reflective film and the protective film are also formed on the curved surface or the inclined surface.

2. The information processing apparatus according to claim 1,
 wherein a part of the end surface portion of the concave mirror includes a protrusion part protruding from the protective film forming surface, and one side end surface of the protrusion part of the concave mirror is formed along the protective film forming surface.

3. The information processing apparatus according to claim 2,
wherein the shape of the curved surface or the inclined surface of the end surface portion connecting the reflective film forming surface to the protective film forming surface extends beyond the other side end surface of the protrusion part in a direction perpendicular to the reflective film forming surface.

4. The information processing apparatus according to claim 1,
wherein a frame is formed on a peripheral portion of the reflective film forming surface.

5. The information processing apparatus according to claim 1,
wherein a substrate of the concave mirror is made of polycarbonate.

6. An information display apparatus configured to display video information of a virtual image on a windshield of conveyance, the information display apparatus comprising:
a display configured to display the video information; and
a virtual image optical system configured to display a virtual image at a front of the conveyance by reflecting light emitted from the display by means of the windshield,
wherein the virtual image optical system includes a concave mirror and an optical element,
wherein the optical element is arranged between the display and the concave mirror; a shape of the concave mirror and a shape of the optical element are configured to correct distortion of the virtual image obtained in correspondence with a position of a line of sight of a driver; each of end surfaces of the concave mirror and the optical element is a curved surface or an inclined surface; and by varying the thickness of the optical element in the optical axis direction the optical distance between the concave mirror and the display is changed to continuously change the display position of the virtual image from a distant place to an adjacent position.

7. The information processing apparatus according to claim 6,
wherein the concave mirror is made of plastic, a part of the end surface portion of the concave mirror includes a protrusion part protruding from the protective film forming surface, and one side end surface of the protrusion part of the concave mirror is formed along the protective film forming surface.

8. A reflecting mirror to be utilized in an information display apparatus, the information display apparatus being configured to display video information of a virtual image on a windshield of conveyance, the reflecting mirror comprising:
a substrate of a mirror, an eccentric aspherical shape or free-form surface shape being formed on one surface of the mirror, the other surface being a protective film forming surface;
a protective film configured to prevent moisture absorption of plastic formed on the protective film forming surface of the substrate of the mirror; and
a reflective film formed on a reflective film forming surface of the substrate of the mirror,
wherein an end surface portion connecting the reflective film forming surface to the protective film forming surface as a facing surface thereof is formed as a shape of a curved surface or an inclined surface, and the reflective film and the protective film are also formed on the curved surface or the inclined surface.

9. The reflecting mirror according to claim 8,
wherein a part of the end surface portion of the substrate of the mirror includes a protrusion part protruding from the protective film forming surface, and one side end surface of the protrusion part of the mirror is formed along the protective film forming surface.

10. The reflecting mirror according to claim 9,
wherein the shape of the curved surface or the inclined surface of the end surface portion connecting the reflective film forming surface to the protective film forming surface extends beyond the other side end surface of the protrusion part in a direction perpendicular to the reflective film forming surface.

11. The reflecting mirror according to claim 8,
wherein a frame is formed on a peripheral portion of the reflective film forming surface.

12. The reflecting mirror according to claim 8,
wherein the substrate of the mirror is made of polycarbonate.

* * * * *